Figure 1:
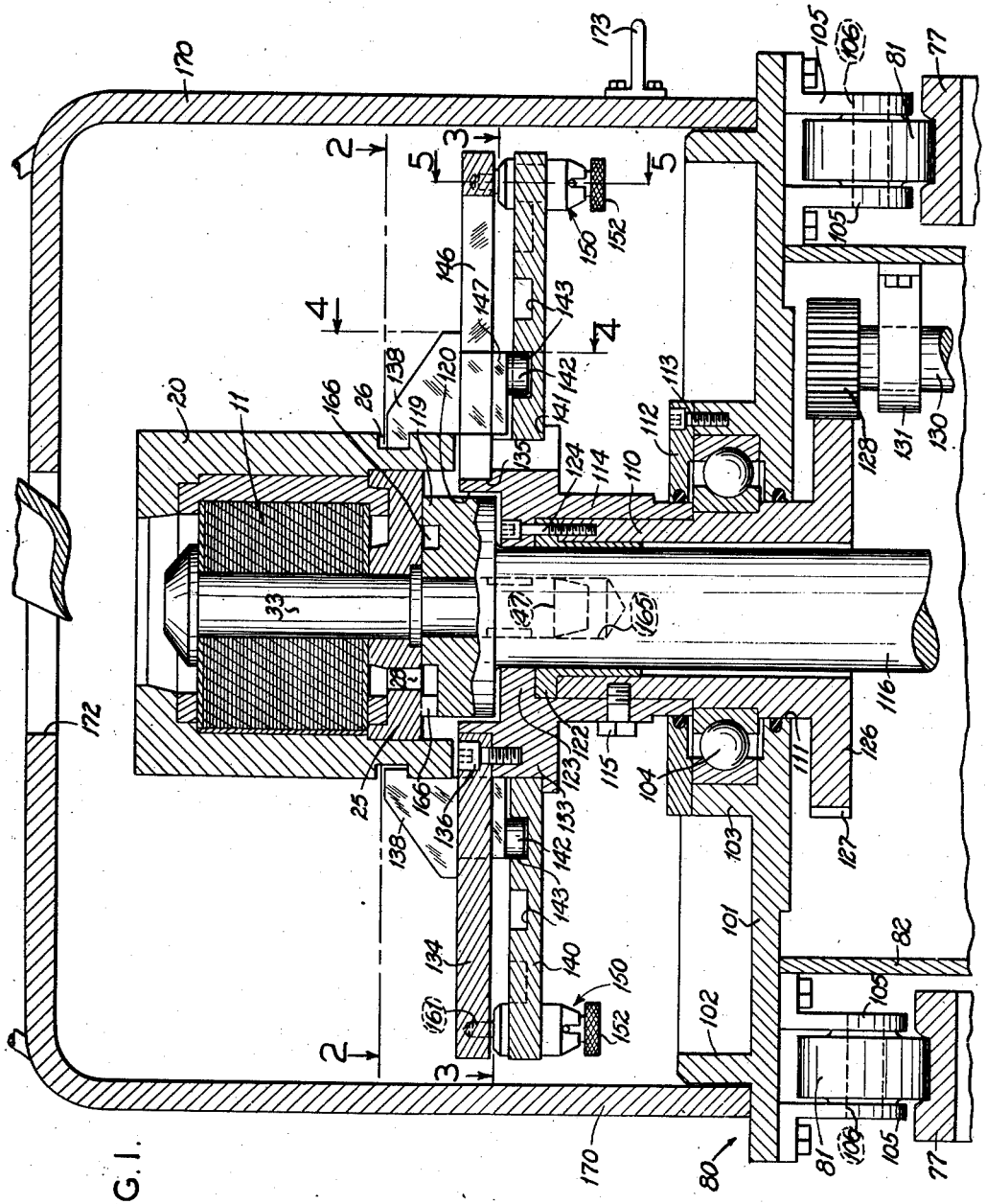

Nov. 7, 1944. G. R. ANDERSON 2,361,906
CENTRIFUGAL APPARATUS
Original Filed July 29, 1940  3 Sheets-Sheet 1

INVENTOR;
GORDON R. ANDERSON
BY Paul L. Kroker
ATTORNEY.

Nov. 7, 1944.   G. R. ANDERSON   2,361,906
CENTRIFUGAL APPARATUS
Original Filed July 29, 1940   3 Sheets-Sheet 2

INVENTOR;
GORDON R. ANDERSON

BY
ATTORNEY

Nov. 7, 1944.  G. R. ANDERSON  2,361,906
CENTRIFUGAL APPARATUS
Original Filed July 29, 1940  3 Sheets-Sheet 3
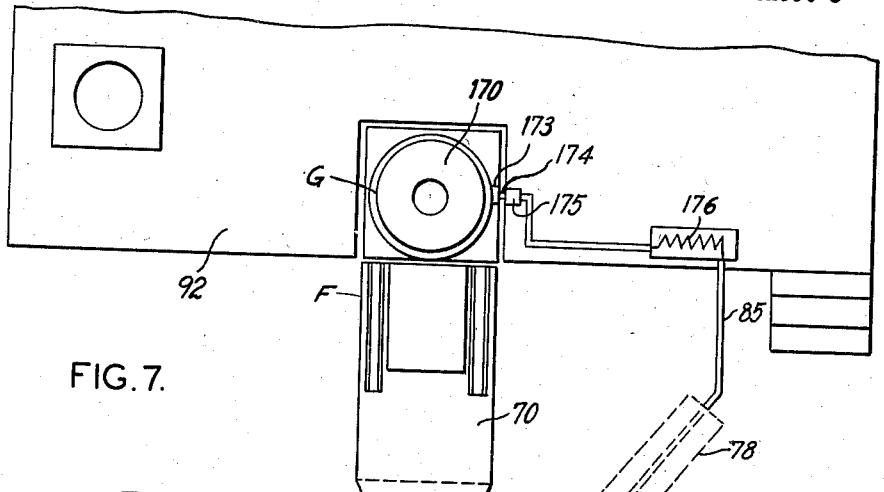
FIG. 7.
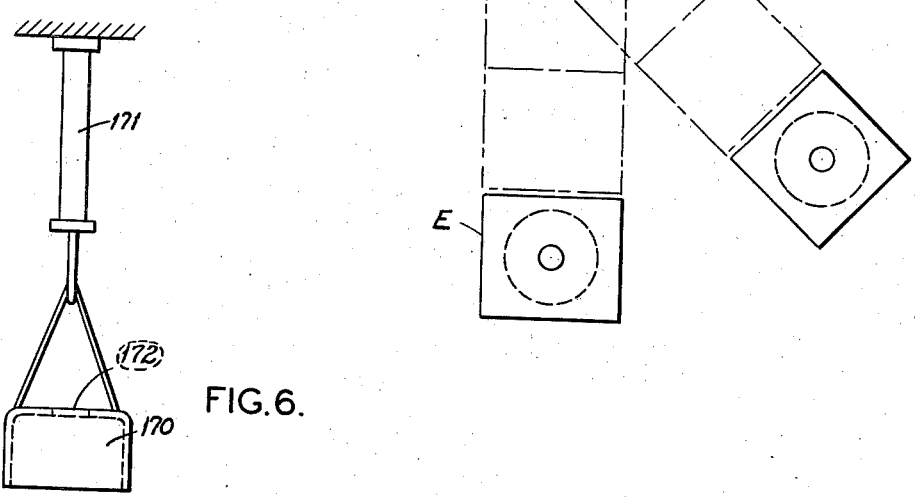
FIG. 6.
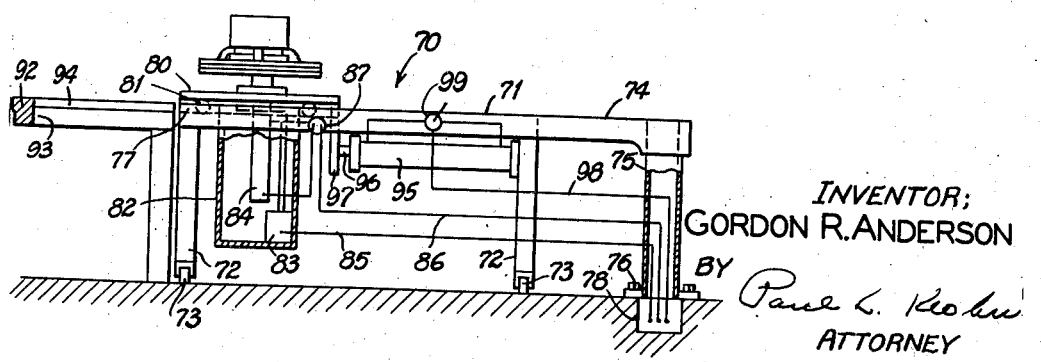
INVENTOR:
GORDON R. ANDERSON
BY
ATTORNEY Patented Nov. 7, 1944

2,361,906

UNITED STATES PATENT OFFICE 2,361,906

CENTRIFUGAL APPARATUS

Gordon R. Anderson, Beloit, Wis., assignor to Fairbanks, Morse & Co., Chicago, Ill., a corporation of Illinois Original application July 29, 1940, Serial No. 348,093. Divided and this application August 24, 1942, Serial No. 455,838

6 Claims. (Cl. 22—65)

This invention relates to centrifugal apparatus, such as casting equipment, and more particularly to improvements in the construction of such apparatus such that it may be utilized as a means for transporting a heated mold unit to be cast thereon, provide an improved supporting table and clamping means for the more rapid securement and release of the heated mold unit and which will preclude rotational displacement of the supporting table until certain protective devices have been properly positioned to enclose the mold unit secured thereto.

The present invention embodies an important item of production apparatus which is particularly well adapted for use in the manufacture of cast rotor members for electric machines or the like; the principles and practice of one method by which such cast rotor members may be produced being embodied in a prior, parent application filed by Gordon R. Anderson on July 29, 1940, and bearing Serial No. 348,093, of which this instant application constitutes a division. Said parent application has since eventuated as Letters Patent No. 2,304,067, bearing issue date of December 8, 1942. In its broader aspects, however, the present improvements are applicable to apparatus for centrifugally processing a variety of materials, usually confined for treatment in a suitable container.

Accordingly, a principal object of the invention resides in the provision of an improved casting table and centrifugally actuated casting mold supporting means operably carried thereon such that the casting table, together with the supporting means may be utilized for the transportation of the casting mold, and further such that the centrifugal supporting means may be adjusted relative to the table in order to facilitate the positionment of the same for the reception and securement of the mold unit thereon for rotation and casting.

Yet another object of the invention resides in the provision of a cooperating protective hood member, in combination with the centrifugal casting apparatus, which is adapted for controlling the energization of a rotary power unit carried by the apparatus as the protective hood is brought into its final shielding position relative to the molding unit carried by the apparatus.

Still another object of the invention is attained in a rotatable support for the molding unit, which presents certain marked improvements over earlier known centrifugal casting apparatus, and which is susceptible of use with or without certain other items of equipment; in the broader sense, the spinning or centrifugal apparatus includes a number of refinements such as mold-locking or holding provisions, safety features, and facilities for effecting a bodily or translatory movement of the molding unit.

Figure 2:
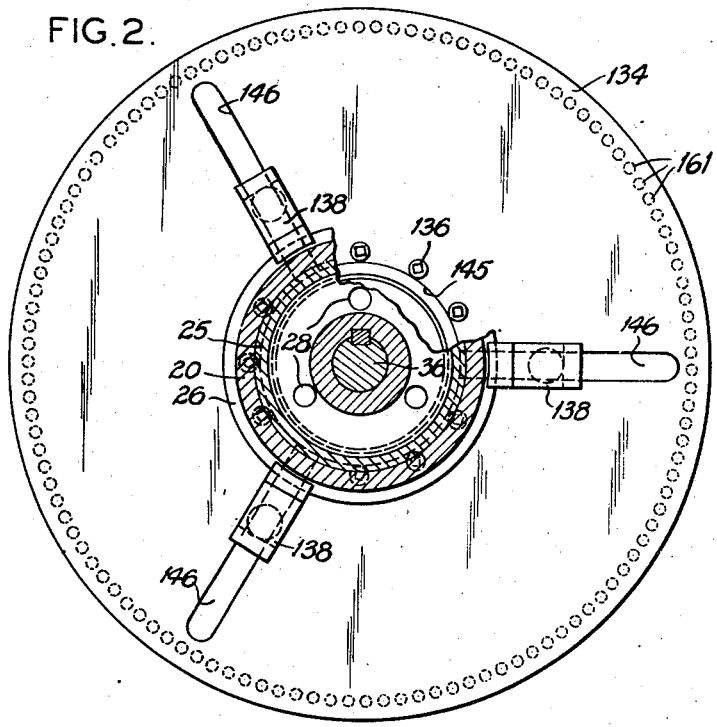
Figure 5:
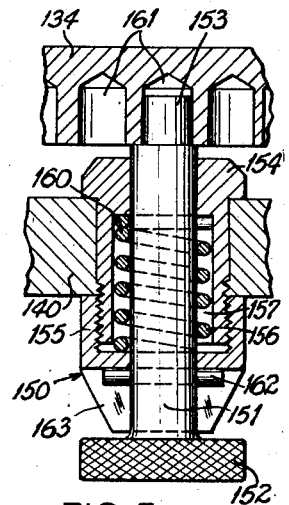
Figure 3:
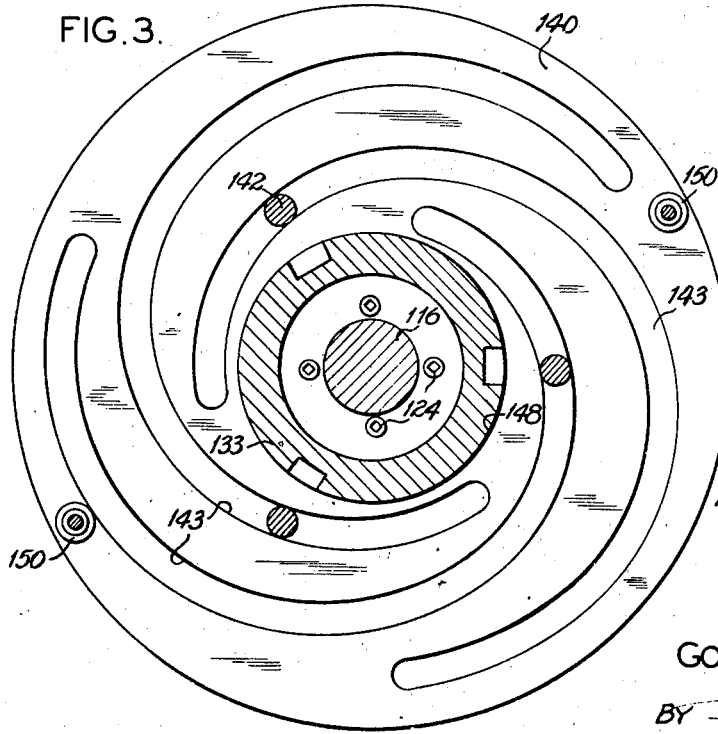
Figure 4:
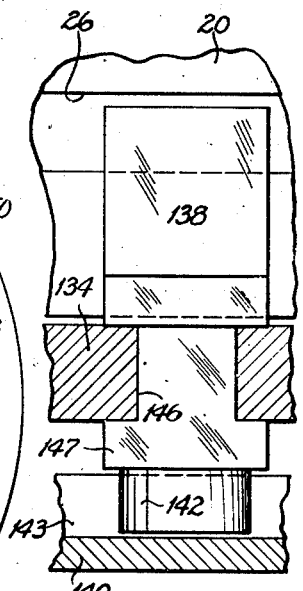

Other objects and advantages will be pointed out in the following description of a preferred embodiment of the centrifugal casting apparatus when considered in view of the accompanying drawings, in which:

Fig. 1 is a sectional view of the supporting table and rotary mold supporting means, as well as a view showing the mold and protective hood in place about the supporting mears; Fig. 2 is a plan view of the mold supporting plate illustrating the clamping jaw guide slots as seen along line 2—2 of Fig. 1; Fig. 3 is a plan view of the cam plate adapted for actuating the clamping jaws as seen along line 3—3 of Fig. 1; Fig. 4 illustrates certain details of the form and mounting provisions for the jaws as seen along line 4—4 of Fig. 1; Fig. 5 is a section through a snap-action locking pin device for locking plates of Figs. 2 and 3 from unintended relative movement as seen along line 5—5 of Fig. 1; Fig. 6 is an assembly elevation of the mobile casting table and mold supporting member, the location of which is indicated in Fig. 7, and Fig. 7 is a diagrammatic floor layout indicating the location of the several items of apparatus and certain steps or phases in the process for making cast rotor members.

The following description of the casting apparatus and its adjunctive agencies, it is believed, will be facilitated by cross reference to the prior parent application, above mentioned, and other divisions thereof, the same characters of reference being preserved throughout in the description of the identical parts and elements of the present casting apparatus.

Before proceeding with a detailed and extended discussion of the centrifugal casting apparatus per se, some brief remarks should be directed to the general organization and arrangement of the cooperating production equipment, of which the present casting apparatus is an important part. The apparatus 70 for handling the heated container or mold assembly 11, 20 and 25 (Fig. 1) is comprehensively indicated in Fig. 6. However, this device is only intended to illustrate a preferred arrangement and construction of a mobile transporting and work-holding means. As shown, a horizontally arranged frame 71 is supported upon corner legs 72, the lower ends of these legs engaging the floor through caster members or wheels 73. This frame and roller leg structure will be hereinafter referred to as the work table. The work table 70 is constrained to move in a circular path by means of an arm member 74, pivotally connecting the work table to a pivot post 75. The pivot post 75, suitably anchored or bolted to the floor by means of bolts 76, is of hollow construction and the space therein is utilized to house and support the electric power lines and air supply lines for certain operating elements carried by the work table. A cable and pipe conduit 78, in the floor, serves to direct these lines to the floor end of the post 75.

The utility of the presently preferred centrifugal casting apparatus (Fig. 1) movably mounted on the work table 70 (Fig. 6), is shown to best advantage in Fig. 7 wherein the translatory character of the work table and the movement of the centrifugal casting apparatus relative to the table is indicated in a schematic diagram. As there indicated, the work table 70 is arranged for pivotal movement about the central post. The centrifugal casting apparatus or spinner plate mechanism is arranged for movement outwardly of the free end of the table 70, such that the casting mold units may be loaded thereon and later removed upon completion of the casting operations. As an illustration, the station E indicates the position of the work table 70 with the spinner plate mechanism in extended, load receiving position. After retraction of the loaded spinner plate mechanism, the table may be moved to the station F and there the spinner plate again moved outwardly to the station G where the pouring and centrifugal casting of the unit take place. The final phase in this series of production steps is the movement of the table 70 to station H where delivery of the completely cast unit occurs. It is also within the contemplation of this schematic production layout, that the station H serve as a receiving station for the casting mold unit in order to facilitate the initial handling thereof. Thus, the loading of the mold units at station H, transportation therefrom to station E for admission to a heating furnace, of any suitable type, reception of the heated mold unit from the furnace and transportation to the stations F and G for casting, conduces to ease and rapidity of operational steps. It is, of course, evident that many possible variations of the described layout will present themselves, therefore the layout indicated is merely indicative of one such possibility and should not be considered as limiting the scope or utility of the apparatus now to be described. A full and complete description of the foregoing production layout may be had upon reference to the prior, parent application Serial No. 348,093, before mentioned.

Turning now to Fig. 6 of the drawings, the details of the centrifugal casting apparatus will now be described. The outer end of work table 70 is provided with a pair of parallel track members 77 and carried on this track is a movable carriage 80 having rolling contact therewith through wheels or rollers 81. (See Fig. 1.) The carriage 80 supports the mold spinning and clamping mechanism which will be described in detail in connection with Figs. 1, 2 and 3. The inner end portion of work table 70 is provided with a top plate or work surface (not shown), upon which certain necessary tools and other parts may be placed so as to be accessible to the operator. The carriage 80 has a depending cylindrical housing 82 rigidly affixed thereto; the housing being adapted to contain an electric motor 83 and a pneumatic ram device 84, these latter members constituting part of the spinning and clamping assembly for the mold and contents, later to be noted. A flexible electric power cable 85 extends from the motor 83 to and through the hollow pivot post 75 and floor conduit 78 to a suitable control station (See Fig. 7). Similarly, air line 86 supplies air to the ram device 84, control valve 87 being inserted in the line and positioned upon the frame 71, as indicated.

Referring again to the movable carriage 80, it will be noted that this member is adapted to move outwardly of the end of the work table 70, so that certain operations may be performed and carried out, as for instance, the reception of the heated mold assembly upon its discharge from the heating furnace (station E of Fig. 7), and again at the pouring station G where the mold is positioned and placed in condition to receive the molten casting metal. In each of these locations the carriage is run out or extended so as to be in its proper position. It is necessary, therefore, to support the carriage while in its extended position, and consequently a suitable supporting track (not shown) is provided on the furnace supporting structure. The rollers 81 ride onto the track members and thus enable the carriage to assume its mold receiving position beneath the furnace opening. Similarly, the raised platform 92, provided at the pouring and spinning station, is recessed or notched at 93 (Figs. 6 and 7) and roller guideways or tracks 94 provided to receive the carriage rollers 81. Carriage 80 is moved into or retracted from this extended position by means of a fluid pressure motor including a pneumatic ram 95, rigidly carried upon the under side of the work table 70 as indicated. The ram arm 96 is secured to a push plate 97 carried at the inner end of the carriage 80. Air for operating this ram is supplied thereto through pipe 98, while a line control valve 99 regulates the direction of ram movement. The work table 70, with the carriage 80 in its retracted position (Fig. 6), may be manually moved through its circular orbit, or a motor or other power means (not shown) may be adapted for this purpose.

The details of the carriage 80 and associated parts are indicated in Fig. 1. The carriage, per se, consists of a relatively flat surfaced supporting frame 101 formed to provide, on its upper face, a rib or raised circumferential flange 102, and a central raised flange 103 adapted to the outer race of a thrust bearing 104. The carriage support consists of rollers or wheels 81 mounted in supporting bracket members 105 through a shaft or axle 106, clearly indicated in Fig. 1. The rollers 81 operate in track or guide members 77, the latter forming a part of the work table 70, before noted. Operably and revolvably carried by the carriage 80 is a work-holding means or mold clamping and spinning organization now to be described.

A supporting sleeve or hollow shaft member 110, projecting through an aperture 111 in frame or plate 101, carries the inner raceway of bearing 104, above noted. A retainer plate 112 confines the bearing 104 to a limited axial movement or play. Screws 113 fasten plate 112 to the upper face of the flange 103 as shown. A second sleeve or head member 114 fits over the upper end of sleeve 110, in telescoped relation, and one or more set screws 115 retain these sleeves in locked relation. Slidably carried within the sleeve 110 is a piston rod or ram 116. The upper end of the rod or ram 116 is enlarged, as at 119, and this head 119 seats in a recess 120 in the sleeve 114. A packing ring 122, of suitable material, is clamped between the upper end of sleeve 110 and the lower face of an internal flange 123 formed on sleeve 114. Screws 124 seat in flange 123 and threadedly engage the upper end of sleeve 110, thus retaining these elements in assembly, all as clearly indicated. The lower end of sleeve 110 is flanged, as at 126, and the peripheral face of this flange 126 is suitably cut to provide gear teeth 127. A pinion gear 128, carried on power shaft 130, meshes with the toothed flange 126 and serves to rotate the sleeve assembly, the latter including the shaft member 110, thus constituting a drive shaft for the spinner plate 134. Shaft 130, suitably supported in bracket arm 131, is direct-connected to the motor 83 (Fig. 6) before noted. Bracket arm 131 is supported on the side wall of the housing 82. The piston rod or ram 116 is connected to a piston (not shown) which operates in an air cylinder 84 (Fig. 6), also contained in the housing 82.

The drive arrangement shown by Fig. 1 is suggested for installations wherein a reduction is desired between motor speed and speed of table 134. However, an equally advantageous, and for some purposes preferable, form of drive (not shown) may be used, with some advantages in simplification, by extending hollow shaft 110 downwardly as the motor shaft, in which case the rotor of the drive motor will be mounted directly on the hollow shaft 110 or extension thereof. In the latter construction, which is regarded as obvious and not requiring detailed illustration, the piston or pressure-actuated ram, including the plunger or ram element 116, may operate axially through the quill shaft 110.

The sleeve 114 is formed to provide an enlarged head portion 133 upon which is mounted a circular container or mold-supporting spinner plate 134. The plate 134 is seated in a recess or annular notch 135 formed in the face of the head portion 133. A series of bolts or screws 136 rigidly secure the plate 134 in the annular notch 135. A plurality of container- or mold-holding fingers preferably constituted by clamping members or jaw elements 138, slidably carried on the plate 134, are adapted to engage the container or mold assembly through the provision of the annular recess 26 formed in top mold member 20, before described, and shown in Fig. 1. A suitable cam plate means 140, carried in a face recess or notch 141 formed in head 133, serves to move the clamping members 138 into or out of engagement with the mold recess 26, as by a camming action between depending follower elements or lugs 142, integrally formed with clamps 138, and grooves or channels 143, each of somewhat spiral trend and formed in the face of plate 140 (Fig. 4).

The details of the spinner plate 134 and cam plate 140 are shown in Figs. 2 and 3, respectively. The spinner plate 134 (Fig. 2) is centrally apertured at 145, so that the plate will fit on the notch 135 of head member 133, before noted. A series of bolt holes are provided adjacent this aperture 145 for the reception of the holding bolts or screws 136. A plurality, shown as three grooves or slots 146, are cut through the plate 134 and are radially directed and spaced at angles of 120°. The clamping members 138 are slidably retained in the channels 146 by means of an integral, depending T shaped portion 147 on each member 138, the details of which are shown clearly in Fig. 4. The follower elements or lugs 142, above pointed out, are carried on the lower faces of the T shaped guide members 147, and project into camming grooves 143 in cam plate 140. As may be seen in Fig. 3, the cam plate 140 is formed and machined to provide the aforesaid spirally directed grooves 143, there being as many such grooves as clamping elements 138. Each of the clamping elements 138, having integrally formed depending T shaped guide 147 and cam follower lug 142, is adapted to be positioned in radial slot 146 by inserting the same in the central aperture 145 of plate 134 so that the T shaped guide 147 may be received in the inner open end of slot 146. Thereafter, these elements are in condition to be moved outwardly in slots 146 for final assembly position with respect to cam plate 140. A brief study of Figs. 2 and 4 will indicate the manner of assembly of the clamping elements 138 on plate 134.

In the assembled arrangement of spinner plate 134 and cam plate 140 upon the head 133 of sleeve member 114 (Fig. 1), the plate 134 is rigidly secured to the head 133 by means of the aforesaid screws 136, while plate 140 is free to rotate relative to the head 133 and plate 134. This relative movement between the plate members is utilized to effect movement of the clamps or jaw elements 138, in radially inward or outward directions. This movement is transmitted to the jaws 138 through sliding contact of lugs 142 in spiral or cam splots 143. To effect this jaw movement, the operator holds plate 134 and turns plate 140 in the desired direction so that jaws 138 are drawn up to engage the mold groove 26, or are backed off to release the same.

Once the jaws are brought up to clamping position (Fig. 1), as above described, a locking device 150, carried by the cam plate 140, is actuated so that the two plates are prevented from further unintended relative movement. The locking device 150 consists of a retractible lock pin or plunger 151 (see Fig. 5), provided with a knurled head 152 at one end, and a recess-engaging tip 153, of reduced diameter. The pin 151 is mounted in a bushing or body member 154 carried in the margin of plate 140, the bushing 154 being inserted in plate 140 from the top or upper face. The bushing 154 projects below the plate 140, and a holding nut or cap member 155 is threadedly received over this projecting end, and turned up into abutment with the bottom face of plate 140. A spring member 156, encircling the pin body 151, is retained in the space 157 between the body member 154 and cap 155. This spring acts, through abutment with the cap 155 and a pressure pin 160 or like member, carried by the pin 151, to urge the pin tip 153 upwardly and into engagement with the selected one of suitably arranged recesses 161 in the plate 134, thereby locking or preventing the plates from further unintended relative movement. Upon disengagement of the locking pin from the plate 134, the device is retained in retracted position by means of the engagement of a second pin 162 with an axially projecting rib 163 carried by the cap 155. The operator, through the knurled head 152, may retract the locking pin 151 and then, when pin 162 clears the end of rib 163, and after a 90° rotation of the head 152, the pin 162 will be positioned across the rib 163 so as to maintain the device in retracted or unlocked position. The spring 156 is held in compression in the body space 157 until disengagement of pin 162 from rib 163. In the present example, two such locking devices are shown (Fig. 1 and 3), but any number may be employed. It will be noted further that the marginal portion of the under face of plate 134 (Figs 2 and 5) is provided with closely arranged recesses 161 so that the plates 134 and 140 may be locked in any one of a plurality of relative positions, as desired.

Referring again to Fig. 1, the procedure for securing and clamping the mold on the spinning plate 134 consists in, first, centering the mold so that the jaw elements 138, when drawn up as before described, will each bear an equal portion of the clamping load, and so that the jaws will positively engage the groove 26 formed in the top mold member 20, and second, actuating the air ram or press 84 so that the head 119, on the upper end of piston rod 116, will properly engage the bottom mold plate 25 and press this plate into rigid engagement with the top mold 20 and against the clamping jaws 138. To assist in centering the mold assembly, the ram head 119 and a portion of the rod 116 are drilled out or otherwise recessed, as at 165, for the reception of the end 47 of arbor 33. This center recess 165 through its centering effect, serves importantly to prevent any rotational unbalance or off-center position of the mold and spinner plate as such an unbalanced condition may create dangerous vibrations during the spinning operation.

The head 119 of the air ram device 84 is further provided with slots or grooves 166, which cooperate with apertures 28 in mold plate 25 to assist in the escape of any air or other gases which are trapped or generated during the pouring period or thereafter.

Upon completion of the clamping and securing operation, the carriage is run outwardly and into the platform recess 93 (Fig. 6) so that the mold and supporting plate are positioned, as at station G. At this point a hood member or safety guard 170 (Figs. 1 and 6) is lowered or placed over the mold and spinner plate assembly, as by means of an air hoist mechanism 171, this air hoist being of any suitable construction. The hood 170 encloses the mold and spinner plate and comes to rest adjacent and in closely fitting relation to the flange 102, on carriage plate 101 (Fig. 1). It will be observed that the interfitting relation of flange 102 and the lower perimetral portion of hood 170, results effectively to protect the operator and exterior portions of the mechanism from any splash of molten metal. It may further be noted that the outside upper margin of flange 102 is bevelled or chamfered as shown, which fact tends to aid in quickly centering the hood 170 on the table 101 and over the flange, as the hood is lowered by the air hoist. This complete enclosure of the rotating parts of the mechanism adds to the safety of the pouring operation, as any splashing of molten casting metal will be confined to the space within the hood 170. The top surface of the hood is provided with a central aperture 172 so that the molten metal may be introduced to the mold body, positioned therebelow (Fig. 1). At the time the hood 170 is positioned as shown in Fig. 1, an arm or striker element 173, carried on the side of the hood, makes contact with the operating arm or lever 174 of a switch 175, preferably of mercoid type, although several suitable forms of other quick acting switch will be suitable (see Fig. 7). The switch 175, upon being actuated to circuit-closing position, completes the circuit to the spinner drive motor 83 through a motor speed control device or resistance unit 176, as by wire 85 (Fig. 7). This power circuit and mercoid switch arrangement is greatly to be desired, as the mold and spinner plate cannot be rotated until the hood or safety guard 170 has been properly positioned as shown in Fig. 1.

The advantages and utility of the above described casting apparatus are best exemplified in connection with the schematic layout or diagram of Fig. 7, as before pointed out. However, there are certain specific advantages to be attained in the present arrangement and cooperation of the work table and spinner plate mechanism carried thereby. For example, the mold-holding devices or clamping jaws actuated into and out of engagement with the mold member by means of the relatively angularly adjustable revolving plate members, constitute an improved feature in apparatus of this type. It is of first importance, in the handling of heated mold units, that the same be set up and prepared for the reception of the casting metal with as little delay as possible. Particularly is this true in the case of a centrifugal casting process such as described in the prior, parent application, before noted. The arrangement of the direct acting, self-centering clamping jaws together with the spirally grooved camming plate, cooperating locking plate, and positive centering agency, is particularly well adapted to achieve the desired speed of mold centering and securement. The mobile arrangement of work table for the support and carriage of the above noted mold-holding device, adequately and efficiently solves the problem of transporting the mold unit from the heating furnace to the pouring and casting station. All non-essential equipment and apparatus has been eliminated by combining and coordinating the major items of production apparatus in the herein described and greatly improved manner.

The foregoing items of apparatus and cooperating adjuncts represent the preferred embodiment of the present invention. However, it should be well understood that the same are susceptible of many changes and alterations without departing from the scope of the invention as defined by the claims hereunto appended.

I claim:

1. In apparatus for centrifugal processing, a rotatable table, a mold assembly arranged on the table, said mold including an arbor projecting therefrom, means for rotating the table, mold holding means carried by the table and including relatively displaceable cam plate means and mold-holding fingers, means actuated by displaceable movement of the cam plate means for actuating the holding fingers into and out of holding engagement with the mold, and means extending axially of a portion of the table rotating means, forming an axial socket located and arranged to coact with said projecting arbor of the mold, for centering the mold axially on the table.

2. In apparatus adapted to support, clamp and rotate a container of material to be centrifugally processed, a frame, a hollow shaft rotatably supported in the frame, a container-supporting plate secured near the end of said shaft and provided with an aperture in line with said shaft, ram means axially movable in said hollow shaft and adapted for thrust-engagement with said container, displaceable container-holding fingers carried by said plate and operable in radial directions into and out of holding engagement with the container, and adapted for centering the container with respect to the shaft and for anchoring said container against the thrust of said ram means.

3. In casting apparatus of the type adapted to support, clamp and rotate a casting mold, the combination of a supporting frame, a hollow shaft operably carried in said frame, a mold-supporting plate secured to one end of said shaft, a plurality of mold-holding fingers slidably carried on said mold-supporting plate, a camming plate rotatively supported on said shaft in concentric adjacence to said mold-supporting plate, a follower element on each of said mold-holding fingers adapted to engage portions of said camming plate whereby upon rotation of said camming plate said fingers will be moved toward or away from holding engagement with a mold, means for rotating said hollow shaft, and ram means axially movable in said hollow shaft and adapted to engage and raise the mold against said holding fingers when the latter have been moved into mold-holding position.

4. Apparatus for centrifugal processing, including a carriage, a work-supporting spinner plate mounted above the carriage, a drive shaft for the spinner plate, projecting below the carriage, drive means connected to the shaft and dependingly carried as a unit below the carriage, wheel elements on the carriage, a wheel track structure to enable predetermined translatory movement of the apparatus into different stations of process significance to the work on the spinner plate, said track structure further including a fixedly pivoted, horizontally movable track section, to and from which the apparatus is adapted to be moved in effecting a translatory movement thereof, from, to and between the several of said process stations.

5. In apparatus for centrifugal casting, a work table swingably movable in a horizontal plane, a carriage adapted for the support of a mold assembly, said carriage being movable on and off of the table, a fluid pressure motor for moving the carriage, means defining a mold spinning station adjacent the path of the table for receiving the carriage with the mold at the time of pouring, ram means supported by said carriage and including an element operable through the carriage and against the mold for compacting parts of the mold and contents, and means for clamping the mold against displacement with respect to the carriage.

6. In apparatus for centrifugal casting, including a work table and a carriage thereon movable with respect to said work table, rotary work-holding means operatively carried on said carriage, means for rotating said work-holding means, said work-holding means comprising relatively displaceable plate elements, a plurality of work-holding fingers, camming surfaces on one of said displaceable plate elements, cam followers on the other of said plate elements and operatively connected with the fingers, means for locking the displaceable plate elements against relative movement, whereby to lock the work-holding fingers in work-retaining positions, a fluid pressure operated piston member extending through the said displaceable plate elements and adapted to engage and press the work against said work-holding fingers, means for pressure-actuating the piston member, and a member depending from said carriage and arranged to support and enclose said means for rotating said work-holding means and said means for pressure-actuating the piston member.

GORDON R. ANDERSON.